United States Patent Office 3,577,454
Patented May 4, 1971

3,577,454
PROCESS FOR CRYSTALLIZING BIS(β-HYDROXY-ETHYL)TEREPHTHALATE
Max H. Keck, Cuyahoga Falls, Ohio, assignor to The Goodyear Tire & Rubber Company, Akron, Ohio
No Drawing. Filed July 1, 1968, Ser. No. 741,312
Int. Cl. C07c 69/82
U.S. Cl. 260—475       4 Claims

ABSTRACT OF THE DISCLOSURE

A process for purifying bis(β-hydroxyethyl)terephthalate by crystallization in which crystal modifying agents are added to solutions of the ester to induce formation of crystals of a size and shape that permits their recovery from the solution in pure state.

---

This invention relates to the purification of bis(β-hydroxyethyl)terephthalate. More particularly the invention relates to an improved method of crystallizing bis(β-hydroxyethyl)terephthalate and recovering the material from solution.

Bis(β-hydroxyethyl)terephthalate can be prepared by reacting terephthalic acid with ethylene glycol. It can also be formed by the depolymerization of preformed polyester resin by treatment of the resin with an excess of ethylene glycol according to methods known in the prior art. The product resulting from depolymerization of polyethylene terephthalate with ethylene glycol is primarily bis(β-hydroxyethyl)terephthalate and small amounts of the dimer of bis(β-hydroxyethyl)terephthalate, diethylene glycol, bis(diethylene glycol)terephthalate, oligomers and low molecular weight color bodies. The recovery of the bis(β-hydroxyethyl)terephthalate made by such processes is very difficult because the bis(β-hydroxyethyl)terephthalate forms a gelatinous mass with the impurities present. It does not readily form sharp well-defined crystals and thus cannot be recovered by the usual filtering or centrifuging operations It is an object of this invention to provide an improved method for crystallizing and purifying bis(β-hydroxyethyl)terephthalate.

Now it has been found that branched chain glycol modifying agents induce bis(β-hydroxyethyl)terephthalate to form well-defined crystals and greatly improve the filterability of the crystalline mass obtained from mixtures of bis(β-hydroxyethyl)terephthalate with its dimer, trimer, and other impurities obtained in the deploymerization of resin with glycol.

The branched chain glycol modifying agents of this invention are compounds of the formula:

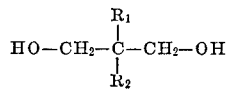

wherein $R_1$ can be H, $CH_3$, $C_2H_5$, $C_3H_7$, $C_4H_9$, $C_5H_{11}$, cyclohexyl or phenyl and $R_2$ can be $CH_3$, $C_2H_5$, $C_3H_7$, $C_4H_9$, $C_5H_{11}$, cyclohexyl or phenyl.

The process of this invention includes the crystallization of bis(β-hydroxyethyl)terephthalate by the addition of a branched chain modifying agent to mixtures of this material so that separation of the bis(β-hydroxyethyl)terephthalate can be accomplished whereas without the addition of the branched chain modifying agent the mixture on crystallization will not permit the separation of bis(β-hydroxyethyl)terephthalate. This is meant to include the separation of the bis ester when it is prepared by reaction of terephthalic acid and ethylene glycol and other reactions in which dimer is generated from terephthalic acid.

The invention is illustrated but not limited by the following examples:

EXAMPLE I

A 100 gram quantity of polyethylene terephthalate polymer, 300 cc. of ethylene glycol and 4 grams of 2-ethyl-2-butyl-1,3-propanediol were placed in a 1-liter 3-neck flask fitted with thermometer, stirrer and reflux-condenser. The mixture was heated and stirred at reflux for three hours at which time a clear solution was obtained. This solution was transferred to a beaker and diluted with an additional 200 cc. of glycol. The mixture was then cooled slowly with slow stirring. A mass of crystals formed. The crystals thus obtained were readily filtered onto a Buchner funnel. A rubber dam was used to squeeze out as much of the liquid phase as possible. The damp filter cake was then suspended in 150 cc. of fresh glycol, gently stirred and again filtered and squeezed fairly dry on the funnel by means of the rubber dam. The damp yield weighed 200 grams. A portion of this product was polymerized by the regular condensation method at 280° C. and 0.20 millimeters of mercury pressure in the presence of manganese acetate and antimony oxide as catalyst. A high molecular weight polymer of good color was formed. The differential thermal analyzer melting point of this polymer was 253° C. This indicated that the bis(β-hydroxyethyl)terephthalate was of good quality and that only a very small amount of impurities such as diethylene glycol linkages were present in the polyester chain.

EXAMPLE II

A 100 gram quantity of polyethylene terephthalate polymer was depolymerized as described in Example I except that no modifying agent was used. The mass obtained on cooling the reaction mixture was a slurry of a gelatinous character which could not be vacuum filtered. Pressure filtration was also unsatisfactory because the filter became clogged and the throughput of filtrate was extremely slow. A small amount of the solid material which was isolated by pressure filtration was polymerized and the resulting polymer had a Differential Thermal Analyzer melting point of only 237° C. indicating the presence of a high level of impurities in the recovered bis(β-hydroxyethyl)terephthalate.

EXAMPLE III

A 4 lb. quantity of polyethylene terephthalate, 4 lbs. of ethylene glycol and 0.16 lb. of 2-ethyl-2-butyl-1,3-propanediol was placed in a stainless steel reactor. The mixture was stirred and heated at 220° C. at 20 lbs. per square inch pressure for 3½ hours. A clear solution resulted. An additional 10 lbs. of ethylene glycol were added to dilute the reaction mixture and the reaction mixture was then allowed to cool while slowly stirring. The crystals formed were recovered by filtration under vacuum. Filtration took place with ease and rapidly. A small sample of the damp filter cake was polymerized to provide a polymer of excellent color, high molecular weight, and a Differential Thermal Analyzer melting point of 254° C.

The above melting point value is identical to that obtained by polymerizing a sample of pure bis(β-hydroxyethyl)terephthalate which had been prepared by the reaction of terephthalic acid and ethylene oxide.

The invention has been described with respect to the purification of bis(β-hydroxyethyl)terephthalate from depolymerized polyethylene terephthalate. The invention is equally applicable to the purification of bis(β-hydroxyethyl) terephthalate produced by other means including the reaction of terephthalic acid and ethylene glycol. The invention is also applicable to copolymers containing at least 85% ethylene terephthalate.

The invention has been described with respect to the use of 2 - ethyl-2-butyl-1,3-propanediol as the branched chain modifying agent. Other branched chain modifying agents that can be used in addition to 2-ethyl-2-butyl-1,3-propanediol include 2,2-diethyl - 1,3 - propanediol; 2,2-dimethyl-1,3-propanediol; 2,2-diphenyl-1,3-propanediol; 2-methyl-2-propyl-1,3-propanediol; 2-ethyl - 2 - phenyl-1,3-propanediol; 2 - cyclohexyl - 2 - ethyl-1,3-propanediol; 2-cyclohexyl-1,3-propanediol and 2-amyl-1,3-propanediol.

The branched chain modifying agents are used in the range of from about 1% to about 7% by weight based on the weight of polymer being depolymerized or weight of bis($\beta$-hydroxyethyl)terephthalate being purified. The preferred range of concentration for the branched chain modifying agent is 2 to 4% by weight based on the weight of polymer being depolymerized or weight of bis($\beta$-hydroxyethyl)terephthalate being purified.

While certain representative embodiments and details have been shown for the purpose of illustrating the invention, it will be apparent to those skilled in this art that various changes and modifications may be made therein without departing from the spirit or scope of the invention.

What is claimed is:
1. The process of purifying bis($\beta$-hydroxyethyl)terephthalate prepared by depolymerizing a polymeric polyethylene terephthalate resin with an excess of ethylene glycol or by reacting terephthalic acid with ethylene glycol which comprises crystallizing said bis($\beta$-hydroxyethyl)terephthalate from ethylene glycol in the presence of a branched chain glycol having the formula

$$HOCH_2-\underset{R_2}{\overset{R_1}{C}}-CH_2OH$$

wherein $R_1$ can be H, $CH_3$, $C_2H_5$, $C_3H_7$, $C_4H_9$, $C_5H_{11}$, cyclohexyl or phenyl and $R_2$ can be $CH_3$, $C_2H_5$, $C_3H_7$, $C_4H_9$, $C_5H_{11}$, cyclohexyl or phenyl, and recovering the bis($\beta$-hydroxyethyl)terephthalate.

2. The process of claim 1 in which the branched chain glycol modifying agent is selected from 2-ethyl-2-butyl-1,3-propanediol; 2,2 - diethyl - 1,3-propanediol; 2,2-dimethyl-1,3-propanediol; 2,2 - diphenyl - 1,3-propanediol; 2-methyl-2-propyl-1,3-propanediol; 2 - ethyl-2-phenyl-1,3-propanediol; 2 - cyclohexyl - 2-ethyl-1,3-propanediol; 2-cyclohexyl - 1,3-propanediol and 2-amyl-1,3-propanediol.

3. The process which comprises depolymerizing polymeric ethylene terephthalate resin with an excess of ethylene glycol and crystallizing the bis($\beta$-hydroxyethyl) terephthalate formed from ethylene glycol containing from 1 to 7 percent by weight based on the weight of the bis($\beta$-hydroxyethyl)terephthalate of a branched chain glycol having the formula $$HOCH_2-\underset{R_2}{\overset{R_1}{C}}-CH_2OH$$

wherein $R_1$ can be H, $CH_3$, $C_2H_5$, $C_3H_7$, $C_4H_9$, $C_5H_{11}$, cyclohexyl or phenyl and $R_2$ can be $CH_3$, $C_2H_5$, $C_3H_7$, $C_4H_9$, $C_5H_{11}$, cyclohexyl or phenyl.

4. The process of claim 3 whereby the branched chain modifying agent is 2-ethyl-2-butyl-1,3-propanediol.

References Cited

UNITED STATES PATENTS 3,268,575  8/1966  Keck _____ 260—475

CHARLES B. PARKER, Primary Examiner

E. J. SKELLY, Assistant Examiner